HIGH FIELD SUPERCONDUCTING MAGNET CONSISTING OF A NIOBIUM-ZIRCONIUM COMPOSITION

Filed April 24, 1961

INVENTORS J. E. KUNZLER
B. T. MATTHIAS

BY George S. Indig

ATTORNEY

INVENTORS J. E. KUNZLER
B. T. MATTHIAS
BY
George S. Indig
ATTORNEY

INVENTORS J. E. KUNZLER
B. T. MATTHIAS
BY George S. Indig
ATTORNEY 3,281,736

HIGH FIELD SUPERCONDUCTING MAGNET CONSISTING OF A NIOBIUM-ZIRCONIUM COMPOSITION

John E. Kunzler, Pleasant Grove, and Bernd T. Matthias, Berkeley Heights, N.J., assignors to Bell Telephone Laboratories, Incorporated, New York, N.Y., a corporation of New York Filed Apr. 24, 1961, Ser. No. 104,991
6 Claims. (Cl. 335—216)

Figure 1:
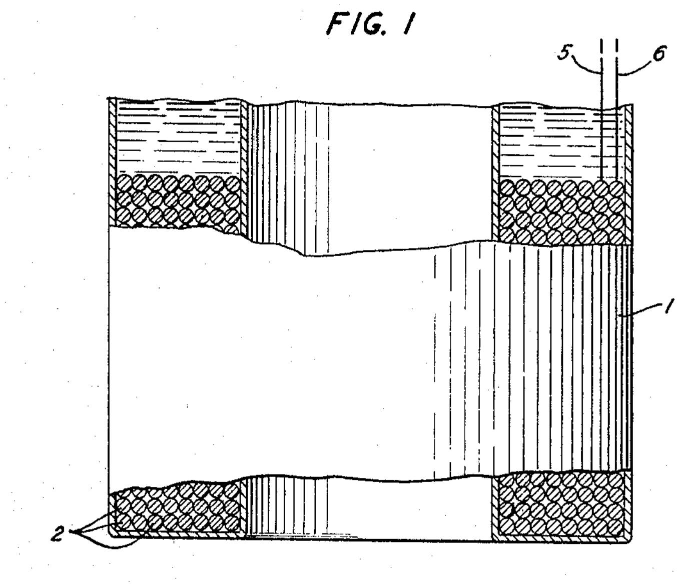

This invention relates to superconducting devices including elements of a composition of the niobium-zirconium system.

The discovery of superconductivity some fifty years ago almost immediately gave rise to conjecture on a host of interesting devices. One of the most interesting of these devices is the superconducting magnet which depends for its operation on the continuous loss-free flow of current through the turns of a shunted solenoid structure. In such a device the turns, constructed of a superconducting material and maintained below the superconducting transition temperature, permit an uninterrupted flow of current which results in an attendant field related to the current and number of turns in the same manner as in an ordinary solenoid. A related structure provides for a control circuit outside the cryostat but owes its advantages to the same superconducting properties.

Although never failing to intrigue each fresh generation of scientists, a practical superconducting magnet has been slow to develop. This is largely due to the earlier observed incompatibility of the superconducting state and encroaching magnetic fields, it having been observed that superconducting materials even below their transition temperatures cease to act as superconductors when placed in a magnetic fields. The strength of the magnetic field effective in destroying superconductivity varies from material to material, increases with decreasing temperature below the critical temperature, and is dependent also on the amount and direction of current flow within the superconductor. This magnitude, sometimes referred to as critical field ($H_c$), for the appropriate conditions represents the largest field that can be produced in a configuration utilizing a given superconducting material. Until fairly recently the highest observed values of $H_c$ were of the order of one or a very few kilogauss. Since fields of this intensity are commonly available in conventional solenoid structures at fairly low power consumption, there was little stimulus to overcome the practical problems involved in maintaining superconducting structures at the very low temperatures required.

Recently, there has been a revival of interest in superconducting magnet configurations, at least in part due to the realization that the resulting fields would be useful in the containing of plasma for the production of electrical power. It has been calculated that conventional solenoid structures, although undoubtedly capable of delivering the required fields, by their nature consume more power than can be produced by the containing of plasmas.

Significant recent discoveries include the finding that compositions of the ductile solid state system molybdenum-rhenium have critical field values approaching 20 kilogauss. Magnetic configurations of such material resulting in field intensities greater than 15 kilogauss have actually been demonstrated. See 32 Journal of Applied Physics, 325–6. More recently, it was discovered that the superconducting compound $Nb_3Sn$, when prepared in a certain manner, is capable of high currents while withstanding fields of the order of at least 100 kilogauss. As striking as are these newly discovered properties of $Nb_3Sn$, the inherent brittleness of the material prevents its ready adaptation to wire configurations. In fact, these striking properties were observed in materials produced by reaction of the elements only after the elements had been powdered, mixed, inserted in tubing, worked down to the desired dimensions, and formed into the desired configuration. Current densities of the order of 150,000 amperes/cm.$^2$ and critical fields of the order of 100 kilogauss justify this involved sequence of processing steps where there is no competing material that can more easily be formed into the desired configuration. While there is reason to believe that current densities of this magnitude will not easily be attained in more ductile materials, there would be interest in materials of improved mechanical characteristics capable of withstanding high values of magnetic field even at reduced critical current density. Whereas critical field is an absolute limit on the ultimate field that can be produced in a superconducting coil, the current carrying capacity can always be increased merely by increasing the diameter of the wire used. Alternatively, the number of turns of a given diameter may be increased.

It has been universally accepted that there is an intimate relationship between critical temperature and critical field, it being uniformly observed that the superconducting state is destroyed with lower and lower applied fields in materials evidencing lower and lower critical temperatures. No deviation in kind from this accepted relationship is observed in a comparison of the materials Mo-Re and $Nb_3Sn$, the first evidencing a maximum critical temperature of about 12° K. ($H_c \cong 18$ kilogauss) and the latter evidencing a critical temperature of the order of 18° K. ($H_c > 100$ kilogauss). Since ductility and workability in general are characteristic of solid solutions rather than compositions, and since critical temperatures higher than that of Mo-Re have been reported only for compounds, it, until recently, seemed unlikely that a ductile material would be found having a value of $H_c$ competing with that of $Nb_3Sn$.

In accordance with the instant invention it has been discovered that solid solutions of the Nb-Zr system, even though evidencing maximum critical temperatures less than those of the Mo-Re system, are capable of withstanding fields of the order of 90 kgauss and greater while in the superconducting state. While the current-carrying capacity of materials of the Nb-Zr system is significantly lower than for $Nb_3Sn$, the containing sheathing used in preparing wire configurations of the prior art material is eliminated, so, in effect, increasing the comparative current-carrying capacity of the new material. Studies thus far conducted have resulted in critical current densities of the order of $2 \times 10^4$ amperes/cm.$^2$ and higher.

As has been noted, the compositions of this invention are solid solutions of the system Nb-Zr. Although these materials evidence an almost complete range of solubility, for purposes of this invention and for the reasons discussed herein, the compositional range of concern is that range intermediate the compositions 10% Nb-90% Zr and 90% Nb-10% Zr, both on atomic percent basis. Wherever reference is made to a composition of the Nb-Zr system or, more briefly, to Nb-Zr, such expression should be considered as designating any composition intermediate and including the two designated solutions.

Figure 2:
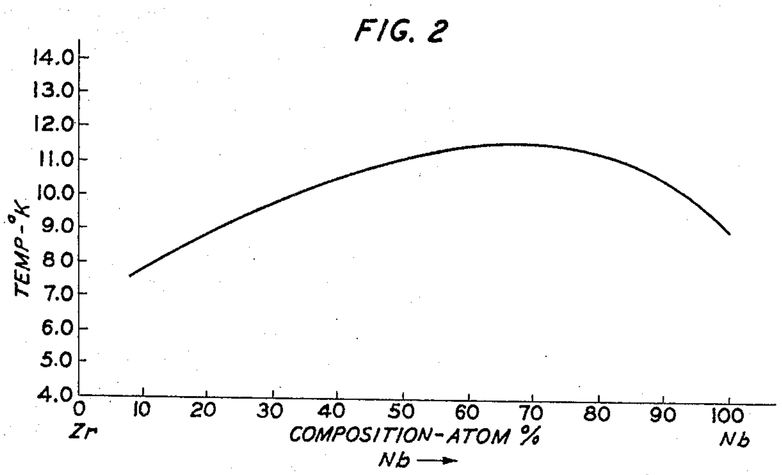
Figure 3:
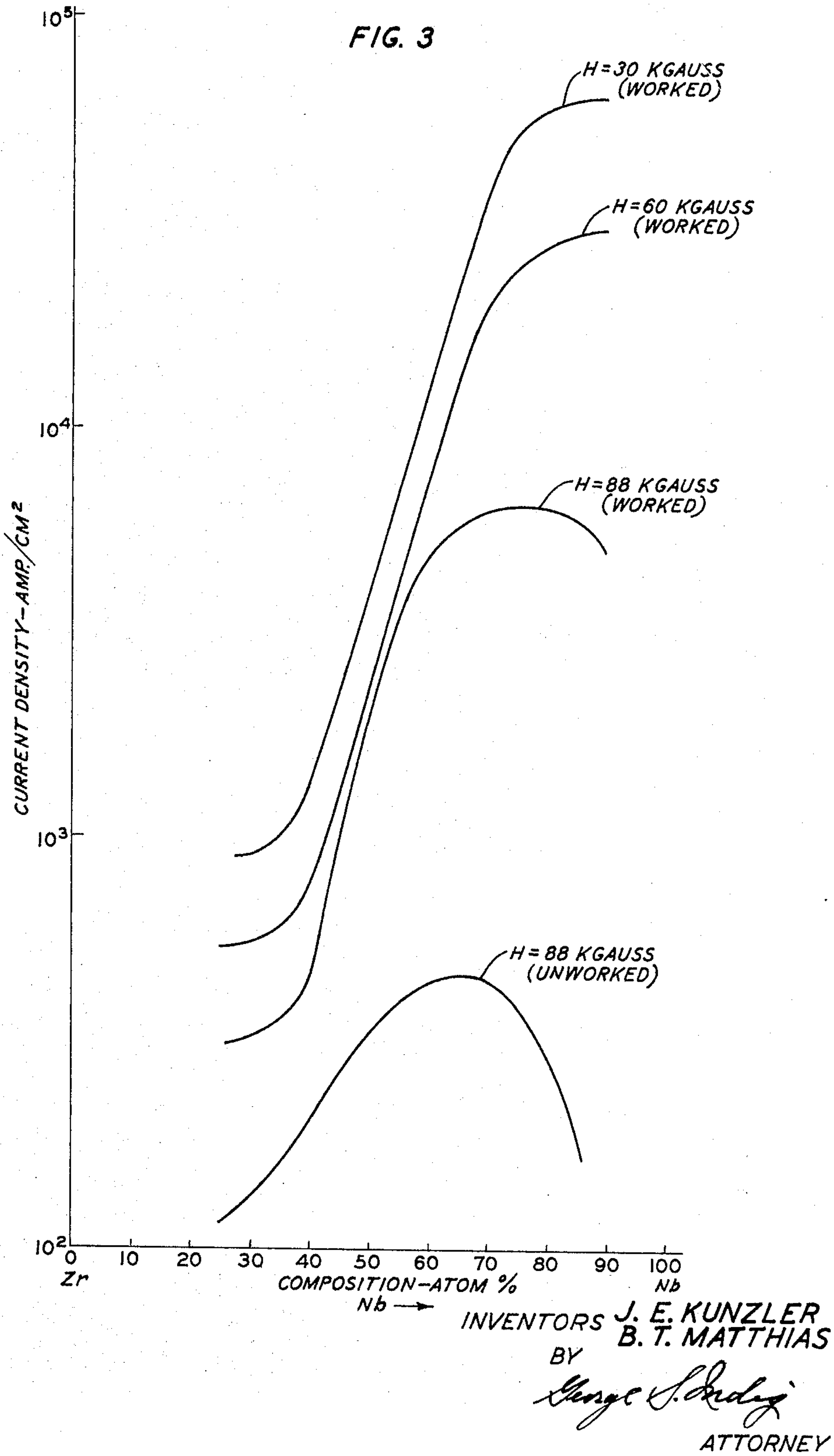
Figure 4:
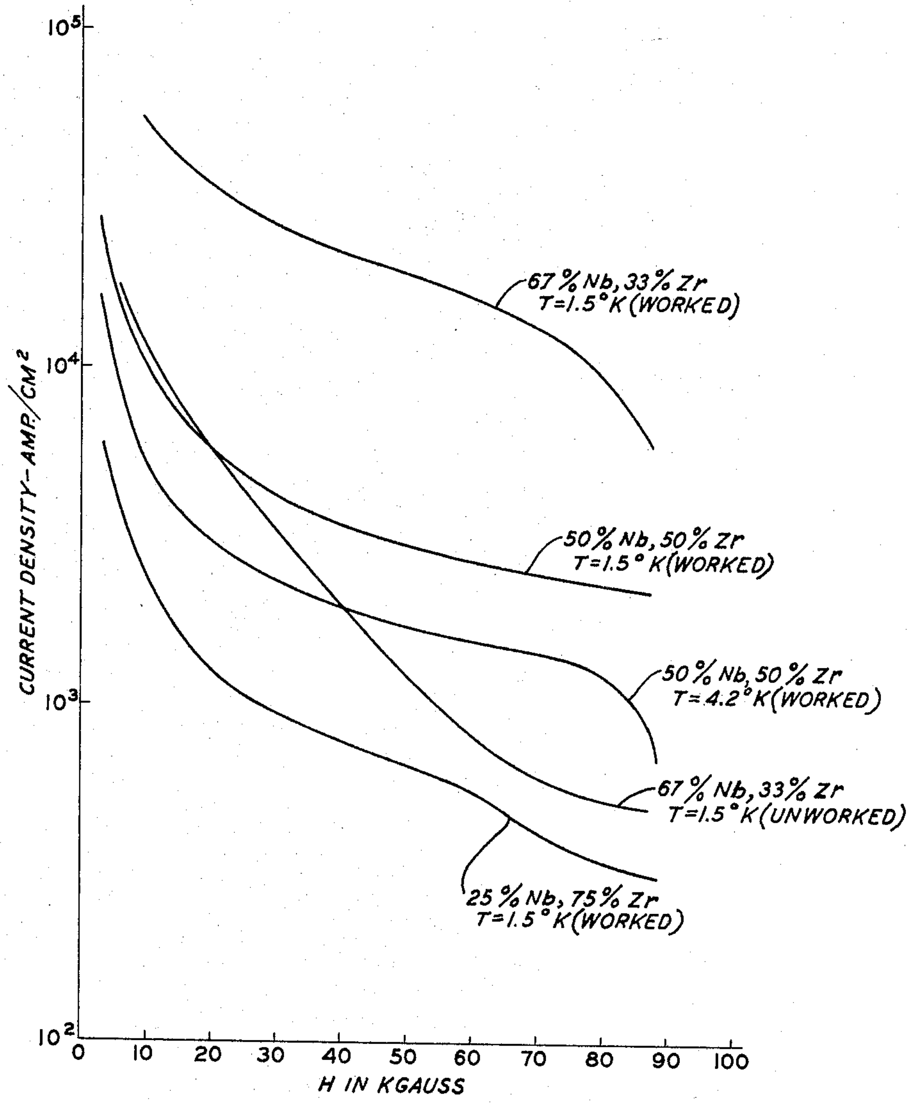

Discussion of the invention is facilitated by reference to the drawing, in which:

FIG. 1 is a sectional view of a magnetic configuration consisting of an annular cryostat containing several windings of wire of an Nb-Zr composition in accordance with this invention;

FIG. 2, on coordinates of temperature in degrees Kelvin and composition in atomic percent, is a rectilinear plot showing the relationship between critical temperature and composition for the Nb-Zr system;

FIG. 3, on coordinates of current density in amperes per square centimeter and composition in atomic percent, is a semilog plot showing the relationship between critical current and composition for different noted values of applied field; and FIG. 4, on coordinates of current density in amperes per square centimeter and magnetic field in kgauss, is a semilog plot showing the relationship between critical current and critical field for the compositions noted.

Referring again to FIG. 1, there is shown an annular cryostat 1 of the approximate dimensions 18″ O.D. by 6″ I.D. by 30″ long, filled with liquid helium and containing 7000 turns per centimeter length of Nb-Zr windings 2. Terminal leads 5 and 6 are shown emerging from the coil. A pumping means, not shown, may be attached to the cryostat so as to permit a temperature variation corresponding with the variation in boiling point of liquid helium and different pressures, the pumping means used in the experimental work described herein permitting regulation of temperature between the values of 1.5° K. and 4.2° K., corresponding with a pressure range of 3.6 millimeters of mercury to atmospheric pressure.

As is described, the experimental work resulting in the measured values reported herein made use of a direct-current supply source in series with one or more variable resistors. By this means it was possible to vary the current flowing through the superconducting specimen and, by also adjusting the applied field, to so determine the relationship between critical current and applied field. In actual operation, a solenoid structure such as that shown in FIG. 1 may avoid resistance losses and so obviate the need for a continuous direct-current source by using an arrangement for shunting the current. Such arrangements are considered well known in the art, conventional circuits as well as certain novel arrangements all usable in conjuction with the instant invention being described in some length in copending U.S. application Serial No. 56,748, filed September 19, 1960, now Patent No. 3,129,359. Each of the two techniques has its advantages. Where the magnetic field is to be varied during operation, it is necessary to use a continuous direct-current source together with a variable resistor or other adjusting means. Where the requirement is for a constant field, optimum efficiency is obtained by use of a shunt. Where extremely high current densities are to be used, it may be unfeasible to use a continuous direct-current source and other exposed circuitry by reason of the large heat losses.

The readings plotted on FIG. 2 were determined by the standard flux exclusion method utilizing measurements made with a ballistic galvanometer across a pair of secondary coils electrically connected in series opposition, both contained within primary coils. In accordance with this method, the sample is placed within one of the coils and the primary is pulsed with a make-break circuit, for example at 6 volts and 10 milliamperes. An individual primary coil with an air core or containing any non-superconducting material evidences a varying induced voltage with time due to penetration of flux. A coil containing a superconducting material evidences no such change insofar as flux is excluded by the superconductor. A non-zero galvanometer reading in a given direction is obtained when the sample placed within one of the secondaries is superconducting. The particular galvanometer used was such that it integrated over a period of approximately a second, an interval adequate to ensure complete penetration of any non-superconducting material contained within a secondary coil. Such readings were repeated for each of approximately twelve samples at successively higher temperatures and a zero reading was obtained, so indicating complete flux penetration and breakdown of the superconducting state. The critical temperature measurements plotted on FIG. 2 correspond with the highest temperature at which a non-zero reading was observed on the galvanometer.

It is noted from FIG. 2 that the highest critical temperature for the Nb-Zr system is about 11.6° K., corresponding with a composition containing between about 60 to 80% niobium. Critical temperature values corresponding with limiting compositions 10% Nb-90% Zr, 90% Nb-10% Zr are approximately 7.7 and 10.5° K., respectively.

The curves of FIGS. 3 and 4 were plotted from data measured in the following manner: A rectilinear sample 5 mils x 12 mils x ⅞ inch was sheared from a worked or unworked body as indicate, copper current leads were attached to the ends, and copper potential leads were attached approximately ¼ inch from the ends so as to be separated by approximately ⅜ inch. The sample was then placed in a cryostat containing liquid helium and was positioned within a solenoid in such manner that the major axis of the sample was normal to the axis of the core of the solenoid. Leads were brought out of the cryostat. The current leads were connected to a 6 volt direct-current source through a variable resistance. The voltage leads were connected to the input of a Liston-Becker Direct-Current Amplifier, the output of which was fed to a Leeds and Northrup type H Speedomax Recorder.

Two reference temperatures were available in the cryostat, and measurements were made at one or the other, or both, as indicated. The first temperature of 4.2° K. corresponds with the boiling point of liquid helium under atmospheric pressure. The second point of 1.5° K. was achieved by maintaining a vacuum of the order of 3.6 millimeters of mercury over the helium surface. Critical current for various values of critical field were determined by selecting a desired field value and increasing the current passing through the samples by adjusting the variable resistance until a measurable drop of the order of a few hundredths of 1 microvolt was observed. The solenoid and circuitry involved limit the measurements to a maximum field of 88 kgauss and maximum currents of slightly under 35 amperes. Critical current was generally measured for about ten different corresponding values of critical field.

The ordinate units of both of FIGS. 3 and 4 are in terms of critical current density in amperes/$cm.^2$. This is the parameter conventionally used in determining current-carrying capacity of a superconducting sample. It is calculated by dividing the measured current by the cross-sectional area. Of course, it is recognized that this very calculation suggests a current-carrying mechanism which, although strictly accurate for comparing the measurements here reported which were all made on samples of approximately the same cross-section, may not be an accurate basis for comparing samples of varying cross-sectional area. Unworked materials of the Nb-Zr system may be expected to evidence properties approaching "soft" superconductivity, that is, it is to be expected that current flowing in such materials is restricted to a very thin shell of a thickness equal to the penetration depth extending about the entire surface of the configuration. On the other hand, the fact that critical current increases greatly with working (see FIG. 4) indicates that the material is taking on some of the characteristics of a "hard" superconductor, and that current flow is, at least in part, filamentary. It has been observed experimentally for several systems that the critical current of a "hard" superconductor scales more or less directly with cross-sectional area, while the critical current of a "soft" superconductor scales with a first order of the diameter. The data presented for the worked Nb-Zr materials is indicative of current density values which may be attained in Nb-Zr wire of any cross-section, assuming the same degree of working. Where for any reason the data presented for the unworked Nb-Zr materials is to serve as a design criterion, the quantities indicated should be adjusted in accordance with the perimeter of the cross-section.

Four curves are presented on FIG. 3. One of these curves represents the variation in critical current density with composition for an unworked material (67% Nb, 33% Zr), while the remaining three show the same relationship for worked materials of the compositions noted. Each of the worked samples was cold-worked by rolling to the final dimensions, the degree of rolling being such as to result in a 97 percent reduction.

For purposes of this invention, cold-working or reduction is intended to indicate a reduction of at least 60 percent. Since, however, the number of filaments increases with increasing reduction, it is generally desirable to introduce the maximum feasible amount of working. Materials of the Nb-Zr system are readily reduced by 90 percent or greater, and this figure represents a minimum preferred degree of working for the purposes of this invention. These limitations are calculated on the usual metallurgical basis, that is, $$\frac{\text{Original cross-sectional area} - \text{final cross-sectional area}}{\text{Original cross-sectional area}} \times 100\%$$

As indicated on FIG. 3, critical current values are plotted for three different values of applied field: 30, 60, and 88 kgauss. The single curve for the unworked samples is plotted for measurements made at the largest field value of 88 kgauss. The curve forms of this figure will be of interest to the person skilled in the art as indicating a trend. From the data plotted, it is seen that the relationship between critical temperature (FIG. 2) and critical current (FIG. 3) is not direct. It is noted, too, that there is some slight shift in the position of peak current density for different values of H. It is assumed that the average worker skilled in this field will accord the plotted data the significance it deserves. Doubtless, deviation in curve form is, in part, due to the dependence of the degree of cold-working on composition, it being expected, although no reliance is had on the theory, that within the Nb-Zr system both maximum critical field and maximum critical current correspond in terms of composition with maximum critical temperature, providing identical physical form. The curves of FIG. 4 are presented to indicate the characteristic variation of critical current with critical field for various compositions in the Nb-Zr system. Curves are presented for a 67% Nb-33% Zr unworked sample and for worked samples of the compositions 25% Nb-75% Zr, 50% Nb-50% Zr, and 67% Nb-33% Zr. All of these curves are plotted from data taken at 1.5° K. For a comparison, a 4.2° K. curve for the 50–50 worked material is presented.

Since the materials utilized herein are not readily available, a suitable technique for their preparation (the one actually used in the described experiments) is presented.

*Preparation of Nb-Zr material*

The desired quantities of elemental materials are weighed out and melted in a button-welding inert arc furnace. The apparatus used consists of a water-cooled copper hearth with a ¾ inch diameter hemispherical cavity. The cavity, together with contents, acts as a first electrode. A second, nondisposable electrode, also water cooled, made for example of tungsten, is spaced from the surface of the contents of the cavity (¼ inch was found suitable). An arc is struck with a high frequency current (0.5 megacycle or greater) and is maintained with a direct-current potential sufficient to bring about melting. For a 10 gram total charge, a 40-volt potential at a spacing of ¼ inch resulted in a current of about 300 amperes, which was sufficient to bring about melting in a period of about 10 to 15 seconds. Since melting is prevented at the interface between the contents and water-cooled crucible, homogenization is brought about only by turning over the charge and repeating the procedure several times. Five or six repetitions were found adequate in the experiments run.

The following experimental technique was followed in preparing the samples for measurement:

Using a charge of about 10 grams total, button dimensions were approximately ¾ inch diameter by ⅜ inch in height. Using an abrasive wheel, the button was first cut into two half circles, after which a slice approximately 15 mils thick was removed parallel to the initial cut. Bars of 15 x 15 mil cross-section and of length equal to the diameter were removed from the slice. The remainder of the half circle from which the half slice was removed was rolled to a strip approximately ¾ inch wide and ¾ inch long (approximately 97 percent reduction). Electrode contact, spaced as described above, was made by use of supersonic soldering or welding, depending on composition.

It is to be considered that the main contribution made by this invention resides in the discovery that materials of the Nb-Zr system manifest critical field values significantly greater than would be expected on the basis of critical temperature. Accordingly, it has been shown that a broad range of Nb-Zr materials, even though having a maximum critical temperature of the order of 11.6° K. as compared with well over 12° K. for Mo-Re, manifests critical field values of 88 kgauss and higher as compared with a maximum of the order of less than 20 kgauss for the prior art material. All of the data presented in the form of the figures, or elsewhere, is considered to be of primary significance in demonstrating that Nb-Zr materials within the broad compositional range 10% Nb-90% Zr and 90% Nb-10% Zr all show disproportionately high critical fields, as noted. A preferred range of from 20% Nb-80% Zr to 80% Nb-20% Zr is seen to have a value of $H_c$ of at least 88 kgauss. A still more preferred range of from 40% to 80% Nb is indicated by the data of the figures. Where maximum current is desired, it is seen that this is best attained by a range of from 60% to 70% Nb.

The broad compositional limits of from 10–90% Nb are based on studies indicating the need for such a minimum of an alloying ingredient to produce substantial deviation from the superconducting characteristics of the pure element. Accordingly, addition of substantially less than about 10% of Zr to Nb results in a solution having properties more nearly resembling those of pure Nb and which will not tolerate values of $H_c$ substantially higher than that of the element. The critical temperature information of FIG. 2 indicates that all included compositions over the broad range have significant superconducting properties as discussed. Preferred ranges are largely based on information of the nature of that set forth in FIGS. 3 and 4. These ranges define those alloy compositions considered most desirable from the standpoint of maximum tolerable field and/or maximum tolerable current.

Although as compared with $Nb_3Sn$, the only material reported to show values of $H_c$ of this order, the new materials are limited by much lower maximum critical currents, materials of the Nb-Zr system are advantageous in that they can be rolled and otherwise worked to produce wire configurations by conventional metallurgical techniques.

In view of the comparisons outlined with the ductile material Mo-Re and the brittle material $Sb_3Sn$, it is to be assumed that the main impact of this invention will be in the construction of superconducting magnets of wire configuration so designed as to result in a field higher than that of the well-known Mo-Re system. In superconducting magnets, as in conventional solenoids, field intensity H is dependent upon the number of turns and current in accordance with the relationship:

$$H = \frac{4\pi ni}{10l} \cong 1.26Ni$$

where $H$=field intensity in gauss,
$n$=number of turns,
$i$=current in amperes,
$l$=length in centimeters, and $N=\frac{n}{l}$=turns per centimeter.

Appended claims are in terms of the $Ni$ product required to produce a field of the order of 30 kgauss or higher, it being assumed that it is in this area that the chief value of the invention lies. Preferred claims are directed to such a product required to bring about a field of at least 60 kgauss.

The invention has been described in terms of a limited number of figures and related text for the sake of expediency. Various modifications on the experimental techniques outlined are apparent. Also, whereas discussion has been in terms of the superconducting system Nb-Zr alone, this material may be alloyed with other materials including superconducting solid solutions and compounds to bring about any desired modification in properties. Other variations and fabricating details are considered within the skill of the artisan skilled in this art and are not specifically set forth. All such modifications are considered to be within the scope of the invention.

What is claimed is:

1. A superconducting magnet configuration comprising a plurality of turns of a material comprising a composition of the Nb-Zr system containing from 10–90 atomic percent Nb, remainder Zr, together with means for maintaining the said turns at a temperature at least as low as the critical temperature for the said material and with means for introducing a current of such magnitude that the fraction $4\pi ni/10l$ equals at least 30 kgauss, where $n$ equals number of turns, $i$ equals current in amperes, and $l$ equals length in centimeters.

2. Configuration of claim 1 in which the said material contains from 20–80 atomic percent Nb, remainder Zr.

3. Configuration of claim 1 in which the said material contains from 40–80 atomic percent Nb, remainder Zr.

4. Configuration of claim 1 in which the said material contains from 60–70 atomic percent Nb, remainder Zr.

5. A superconducting magnet configuration comprising at least one turn of a material comprising a composition of the Nb-Zr system containing from 10–90 atomic percent Nb, remainder Zr, together with means for maintaining the said at least one turn at a temperature at least as low as the critical temperature for the said material and with means for introducing a current of such magnitude that the fraction $4\pi ni/10l$ equals at least 30 kgauss, where $n$ equals numbed of turns, $i$ equals current in amperes, and $l$ equals length in centimeters.

6. A superconducting magnet configuration comprising at least one turn of a material comprising a composition of the Nb–Zr system containing from 10–90 atomic percent Nb, remainder Zr, together with means for maintaining the said at least one turn at a temperature at least as low as the critical temperature for the said material and with means for introducing a current of such magnitude that the fraction $4\pi ni/10l$ equals at least 60 kgauss, where $n$ equals number of turns, $i$ equals current in amperes, and $l$ equals length in centimeters.

References Cited by the Examiner

UNITED STATES PATENTS 2,985,531 5/1961 Gordon et al. -------- 75—177

OTHER REFERENCES

Autler, "Superconducting Electromagnets," The Review of Scientific Instruments, April 1960, pp. 396–373, vol. 31, No. 4.

BERNARD A. GILHEANY, *Primary Examiner.*

SAMUEL BERNSTEIN, JOHN F. BURNS, *Examiners.*

G. HARRIS, Jr., *Assistant Examiner.*